United States Patent [19]

Nakayama

[11] Patent Number: 5,596,626
[45] Date of Patent: *Jan. 21, 1997

[54] CORDLESS TELEPHONE SET WITH A BATTERY AND A BATTERY CHARGER AND HAVING A POWER SUPPLY LINE SETTING UNIT FOR ESTABLISHING A POWER SUPPLY LINE FOR POWER SUPPLY FROM THE BATTERY OR THE BATTERY CHARGER

[75] Inventor: Mikio Nakayama, Kawasaki, Japan

[73] Assignee: Fujitsu Limited, Kanagawam, Japan

[*] Notice: The term of this patent shall not extend beyond the expiration date of Pat. No. 5,481,593.

[21] Appl. No.: 541,476

[22] Filed: Oct. 10, 1995

Related U.S. Application Data

[63] Continuation of Ser. No. 332,458, Oct. 31, 1994, Pat. No. 5,481,593, which is a continuation of Ser. No. 912,315, Jul. 13, 1992, abandoned.

[30] Foreign Application Priority Data

Jul. 19, 1991 [JP] Japan .................................... 3-179892

[51] Int. Cl.$^6$ .................................................... H04Q 7/20
[52] U.S. Cl. .................................................... 379/61; 455/89
[58] Field of Search ............................. 379/61, 58, 59, 379/60; 455/89, 33.1, 127, 73

[56] References Cited

U.S. PATENT DOCUMENTS

| | | |
|---|---|---|
| 4,458,111 | 7/1984 | Sugihara . |
| 4,511,761 | 4/1985 | Yamazaki et al. . |
| 4,595,795 | 6/1986 | Endo . |
| 4,995,072 | 2/1991 | Pedigo ........................................ 379/61 |
| 5,175,874 | 12/1992 | Auchter ....................................... 455/89 |
| 5,481,593 | 1/1996 | Nakayama ................................ 379/61 |

FOREIGN PATENT DOCUMENTS

| | | |
|---|---|---|
| 0303067 | 2/1989 | European Pat. Off. . |
| 60-248033 | 12/1985 | Japan . |
| 2217151 | 10/1989 | United Kingdom . |
| 2222749 | 3/1990 | United Kingdom . |

OTHER PUBLICATIONS

America Online, "Review: Panasonic EB-H40" Mar. 1995.

Primary Examiner—William Cumming

[57] ABSTRACT

A cordless telephone set includes a battery, and a communications part for communicating with another cordless telephone set via a transmission medium including radio channels, the communications part comprising a part which detects a call received via the transmission medium and indicates receipt of the call. A D.C. signal detection unit detects a D.C. signal supplied from a battery charger when a battery is coupled to the battery charger and charged thereby. A power supply line setting unit, which is coupled to the part of the communications part and the D.C. signal detection unit, establishes a power supply line for supplying electricity generated by the battery charger to the part of the communications part when the D.C. signal detection unit detects the D.C. signal.

6 Claims, 13 Drawing Sheets

5,596,626

CORDLESS TELEPHONE SET WITH A BATTERY AND A BATTERY CHARGER AND HAVING A POWER SUPPLY LINE SETTING UNIT FOR ESTABLISHING A POWER SUPPLY LINE FOR POWER SUPPLY FROM THE BATTERY OR THE BATTERY CHARGER

This is a continuation of application Ser. No. 08/332,458, filed Oct. 31 1994, now U.S. Pat. No. 5,481,593 which, in turn, is a continuation application of Ser. No. 07/912,315, filed Jul. 13, 1992, and now abandoned.

BACKGROUND OF THE INVENTION

1. Field of the Invention

The present invention generally relates to cordless telephone sets, and more particularly to a cordless telephone set having a function of detecting a call while a built-in battery built is being charged.

2. Description of Related Art

FIG. 1A shows a related cordless telephone set 10. The cordless telephone set 10 is configured as follows. A radio interface unit 1 communicates, via a radio channel, with a host device (FIG. 1B) connected to a telephone line TL coupled to an exchange EX. A portable telephone system is made up of the portable telephone set 10 and the host device. A speech receiver 2 receives a speech signal transmitted by another subscriber and received via the host device, the radio channel and the radio interface unit 1. An amplifier 3 amplifies the speech signal received by the speech receiver 2. An amplified speech signal output by the amplifier 3 drives a speaker 4, which converts the amplified speech signal into an acoustic speech signal. A microphone 5 converts an acoustic speech signal into a corresponding electric speech signal. An amplifier 6 amplifies the electric speech signal from the microphone 6, and outputs an amplified speech signal to a speech transmitter 7. The speech transmitter 7 generates a radio wave from the amplified speech signal. The radio wave is transmitted via the radio interface unit 1, a radio channel and the host device. A signal receiver 8 receives call control signals output by the above exchange and received via the telephone line, the radio channel, the host device and the radio interface unit 1 and transmits these control signals to a processor 11. Examples of these call control signals are a calling signal, a disconnect signal, a response signal, and a clear signal. A signal transmitter 9 receives call control signals from the processor 11 and transmits these call control signals to the exchange via the radio interface unit, the radio channel, the host device and the telephone line. Examples of the call control signals are a call signal, a select signal of a caller, a disconnect signal, a response signal, and a clear signal. The processor 11 controls the entire operation of the cordless telephone set 10. More specifically, the processor 11 rings a sounder 14 in response to receipt of the calling signal from the signal receiver 8, and outputs the select signal based on a dialed number input by means of a ten-key keypad 12 to the signal transmitter 9. Further, the processor 11 detects the ON/OFF states of a hook switch 13, and outputs the calling signal, the response signal, the disconnect signal, the clear signal or the like to the signal transmitter 9.

Electricity necessary to operate the above-mentioned structural elements is generated by a battery 15, and is supplied thereto via a switch 19 and a power supply line 20 or 21. The power supply line 20 carries electricity necessary to ring a sounder 14 and thereby notify the subscriber of receipt of a call to the radio interface unit 1, the signal receiver 8 and the processor 11. The power supply line 21 carries electricity necessary to operate all of the other structural elements.

The switch 19 selects one mode from among three modes, that is, a pause mode P, a standby mode S, and an active mode A. In the pause mode P, an output terminal of the battery 15 is completely disconnected from all the structural elements of the cordless telephone set 10. In the standby mode S, the battery 15 is connected to only the power supply line 20 via the switch 19. In the active mode A, the battery 15 is connected to the power supply line 21, and the power supply line 20 via a diode 22.

When the active mode A is selected by the switch 19, electricity generated by the battery 15 is supplied to all of the structural elements, and hence the cordless telephone set 10 is maintained in an active state in which it can receive a call and transmit a call. It will be noted that a large amount of energy is consumed in the cordless telephone set 10 in the active mode A. When the standby mode S is selected by the switch, electricity is supplied to only the radio interface unit 1, the signal receiver 8 and the processor 11. Hence, in the standby mode S, an amount of energy is consumed smaller than that consumed in the active mode A. When the pause mode P is selected by the switch 19, electricity is not supplied to the structural elements at all. Hence, energy stored in the battery 15 is consumed only slightly. In the pause mode P, it is impossible to notify the subscriber of receipt of a call.

With the above in mind, it is desired that the switch 19 be maintained in the pause mode P when there is no need to use the cordless telephone set 10 and that the switch 19 be maintained in the standby mode P when the subscriber is to be notified of receipt of a call. When the subscriber responds to a call, he or she switches the mode of the switch 19 from the standby mode S to the active mode A. This switching operation is carried out if the subscriber calls another subscriber.

Generally, a battery charger is provided for the cordless telephone set. For example, a battery charger is built in the host device. FIG. 2 shows a battery charger 30 for use in the cordless telephone set 10 shown in FIG. 1A. The battery charger 30 has a power unit 31, a commercial power supply plug 32, and a pair of terminals 33. The power unit 31 generates a D.C. current from commercial power supplied via the plug 32. A pair of the terminals 33 is respectively connected to a pair of terminals 16 of the cordless telephone set 10 shown in FIG. 1 when the battery 15 is charged. The D.C. current generated by the power unit 31 is supplied to a charging circuit 17 via the terminals 33 and 16. The charging circuit 17 generates a battery charging current from the received D.C. current and outputs it to the battery 15 via a diode 18. Energy consumed, for example, in the standby mode S is compensated for by means of charging by means of the charging circuit 17.

When the battery 15 is charged in the standby mode S, the subscriber can be notified of receipt of a call. However, there is a possibility that the charging of the battery 15 is carried out in the pause mode P and nevertheless the subscriber wishes to be notified of receipt of a call. In this case, in conventional technology the subscriber is not notified of receipt of a call.

SUMMARY OF THE INVENTION

It is a general object of the present invention to provide a cordless telephone set in which the above disadvantage of the related cordless telephone set is eliminated.

A more specific object of the present invention is to provide a cordless telephone set capable of notifying the subscriber of receipt of a call even if the built-in battery is being charged in the pause mode.

The above objects of the present invention are achieved by a cordless telephone set comprising: communications means for communicating with another cordless telephone set a transmission medium including radio channels, the communications means comprising a part that detects a call received via the transmission medium and indicates receipt of the call; a battery generating electricity necessary to operate the cordless telephone set; D.C. signal detection means for detecting a D.C. signal supplied from a battery charger when the battery is coupled to the battery charger and charged thereby; and power supply line setting means, coupled to the part of the communications means and the D.C. signal detection means, for establishing a power supply line for supplying electricity generated by the battery charger to the part of the communications means when the D.C. signal detection means detects the D.C. signal.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 1A:
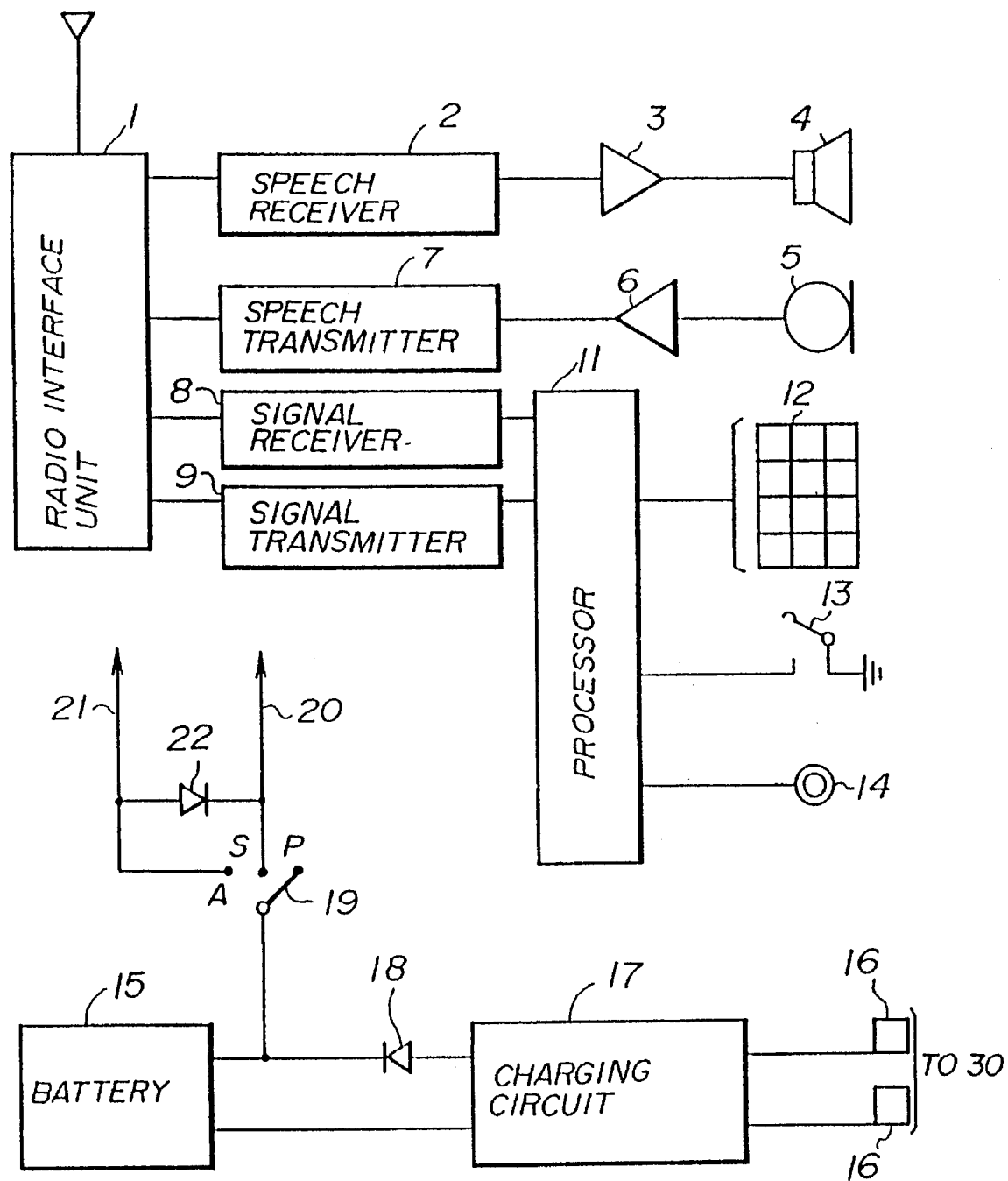
FIG. 1A is a block diagram of a related cordless telephone set.
Figure 1B:
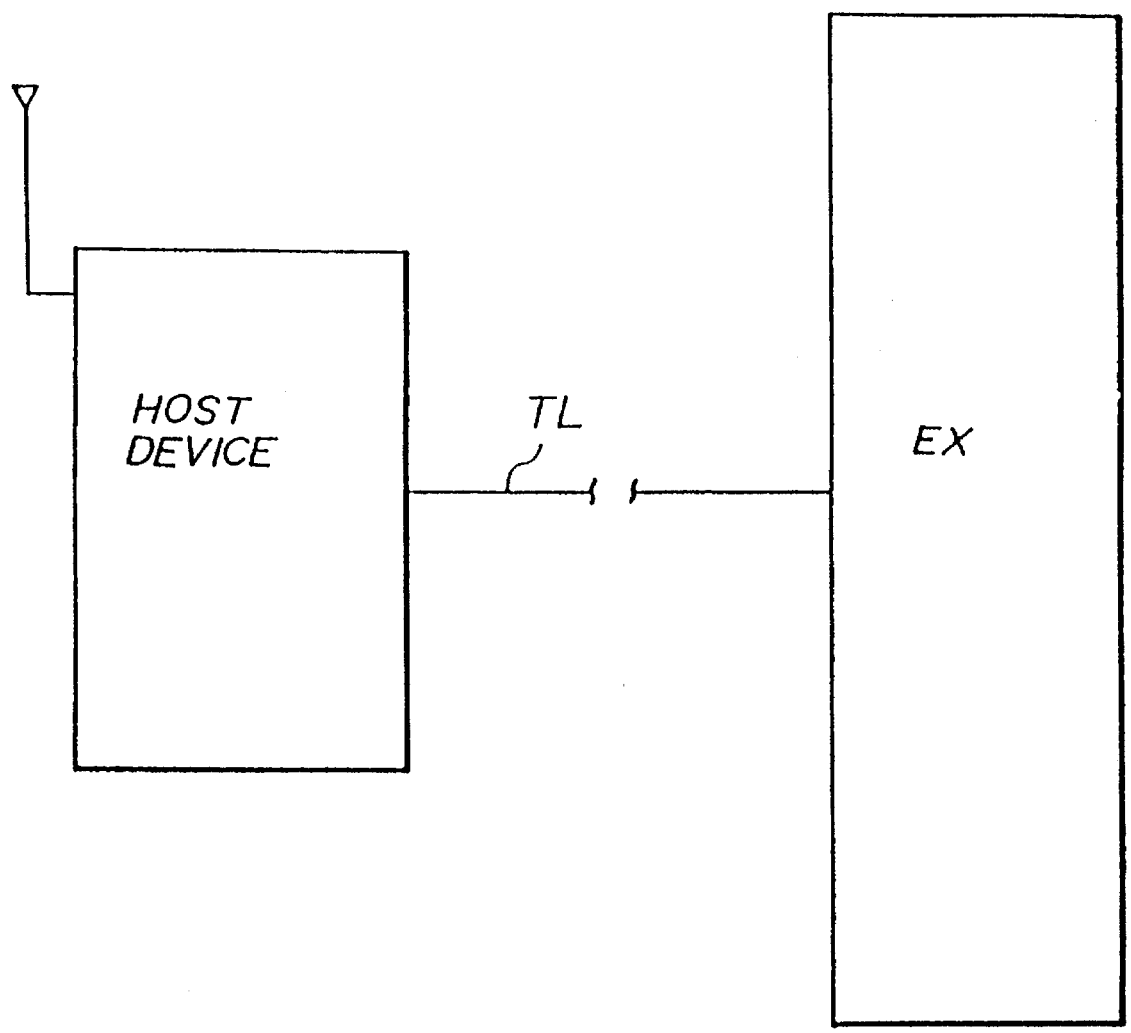
FIG. 1B is a block diagram of a host device coupled to the cordless telephone set via radio channels.
Figure 2:
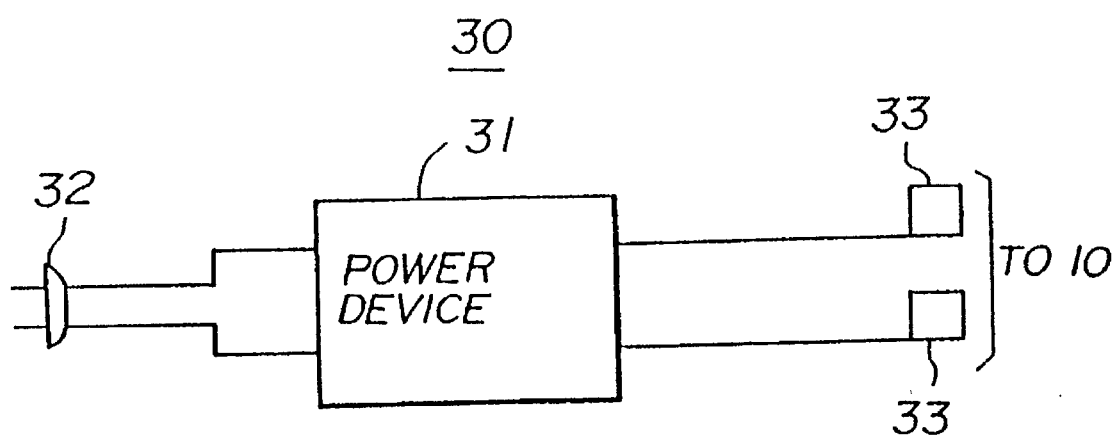
FIG. 2 is a block diagram of a battery charger for use in the cordless telephone set shown in FIG. 1A.
Figure 3:
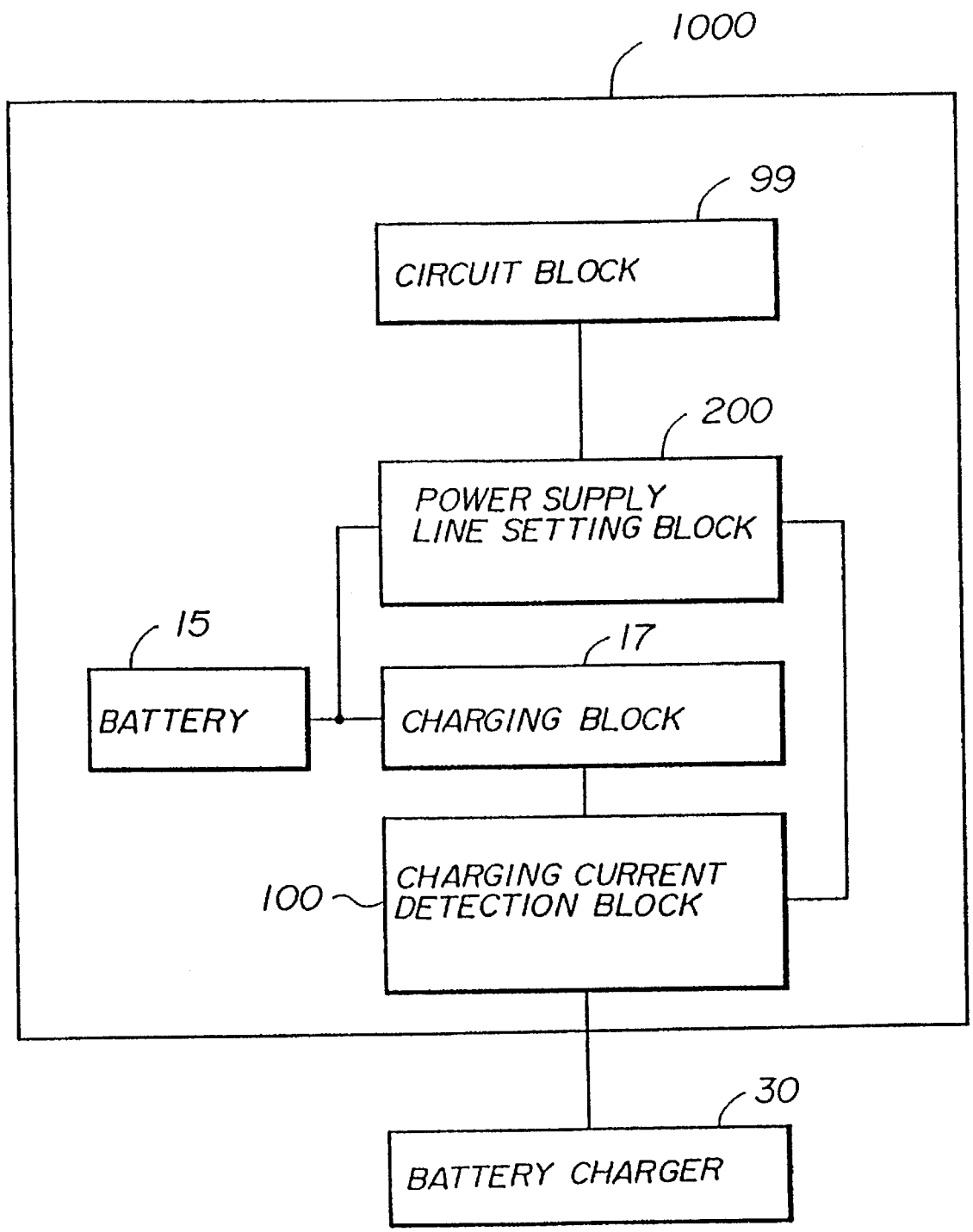
FIG. 3 is a block diagram showing an overview of a portable telephone set according to a first embodiment of the present invention.

FIG. 3 is a block diagram showing an overview of a cordless telephone set according to a first embodiment of the present invention. In FIG. 3, parts that are the same as parts shown in the previously described figures are given the same reference numerals as previously. A cordless telephone set 1000 shown in FIG. 3 comprises a circuit block 99, a charging current detection block 100, and a power supply line setting block 200. The circuit block 99 corresponds to a part of the structure which detects a call addressed to the portable telephone set 1000 and notifies the subscriber of receipt of this call by means of a sounder or the like. The charging current detection block 100 detects a D.C. current supplied from the battery charger 30 to the charging circuit 17. The power supply line setting block 200 establishes a power supply line for supplying electricity to the circuit block 99 when the charging current detection block 100 detects the D.C current from the battery charger 30. The power supply line established by the charge line setting block 200 includes a line connected to the battery charger 30 and bypasses the charging circuit 17. Hence, even if the battery 15 is being charged in the pause mode, the circuit block 99 of the cordless telephone set 1000 can receive a call and indicate receipt of this call.

Figure 4:
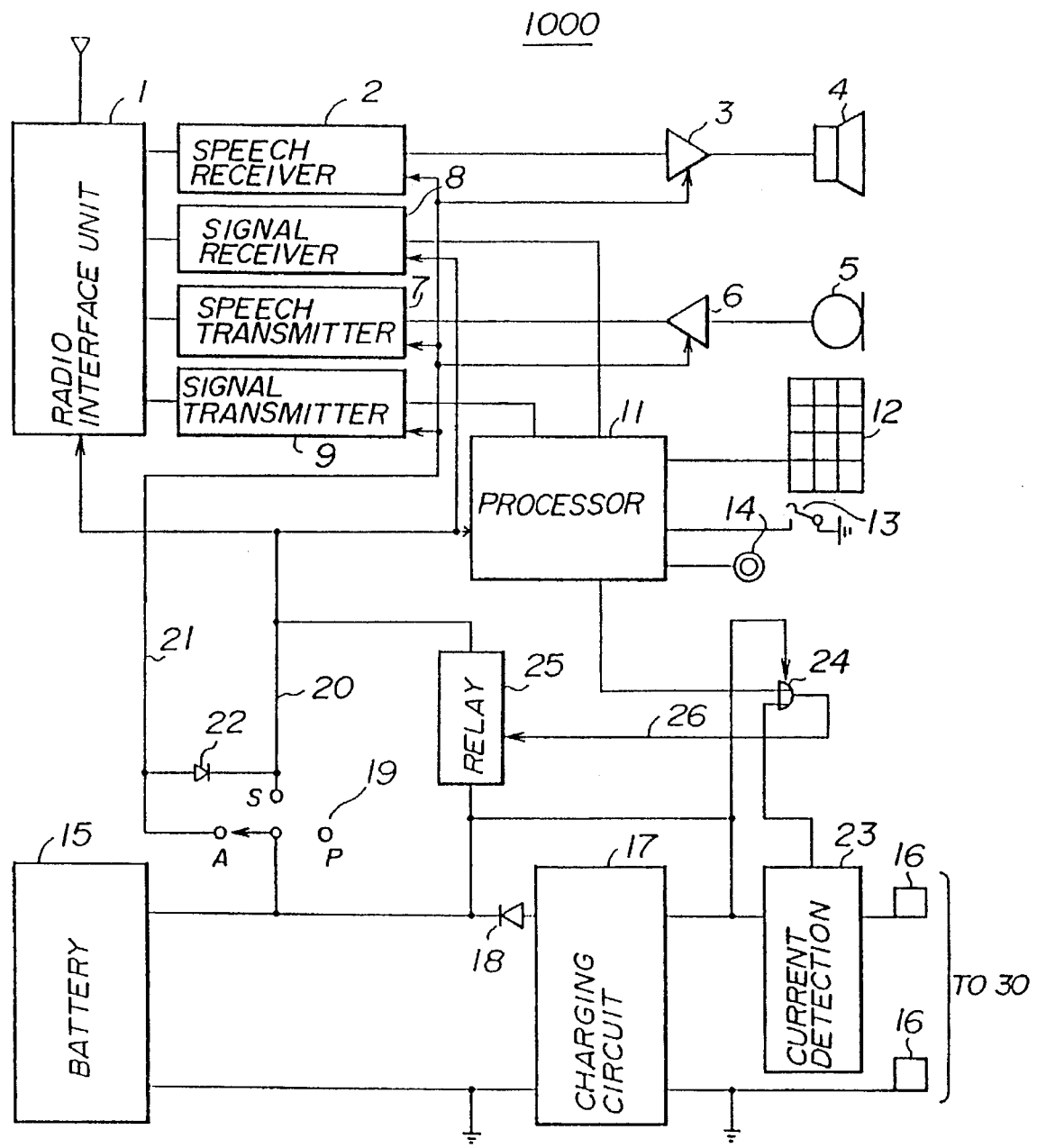
FIG. 4 is a block diagram illustrating the detail of the portable telephone set shown in FIG. 3.

FIG. 4 is a block diagram showing the details of the cordless telephone set 1000 shown in FIG. 3. In FIG. 4, parts that are the same as parts shown in the previously described figures are given the same reference numerals as previously. The charging current detection block 100 shown in FIG. 3 comprises a current detection unit 23. The power supply line setting block 200 shown in FIG. 3 comprises a logic OR gate 24 and a relay 25. The output terminal of the current detection unit 23 is connected to the relay 25 and to the battery 15. The circuit block 99 corresponds to the radio interface unit 1, the signal receiver 8 and the processor 11. One of the two input terminals of the OR gate 24 is directly connected to the battery 24, so that the OR gate 24 is always active. When the processor 11 is informed of receipt of a call by means of the signal receiver 8, the processor 11 outputs a control signal to the OR gate 24 via its control port. This control signal indicates receipt of the above call. An output terminal of the current detection unit 23 is connected to the OR gate 24. An output terminal of the OR gate 24 is connected to a control terminal of the relay via a control line 26.

When the battery 15 is charged, the terminals 33 of the battery charger 30 are respectively connected to the terminals 16 of the portable telephone set 1000, and the D.C. current generated by the power device 31 is applied to the charging circuit 17 via the current detection unit 23. The charging circuit 17 generates the charging current from the received D.C. current, and supplies it to the battery 15 via the diode 18.

Figure 5:
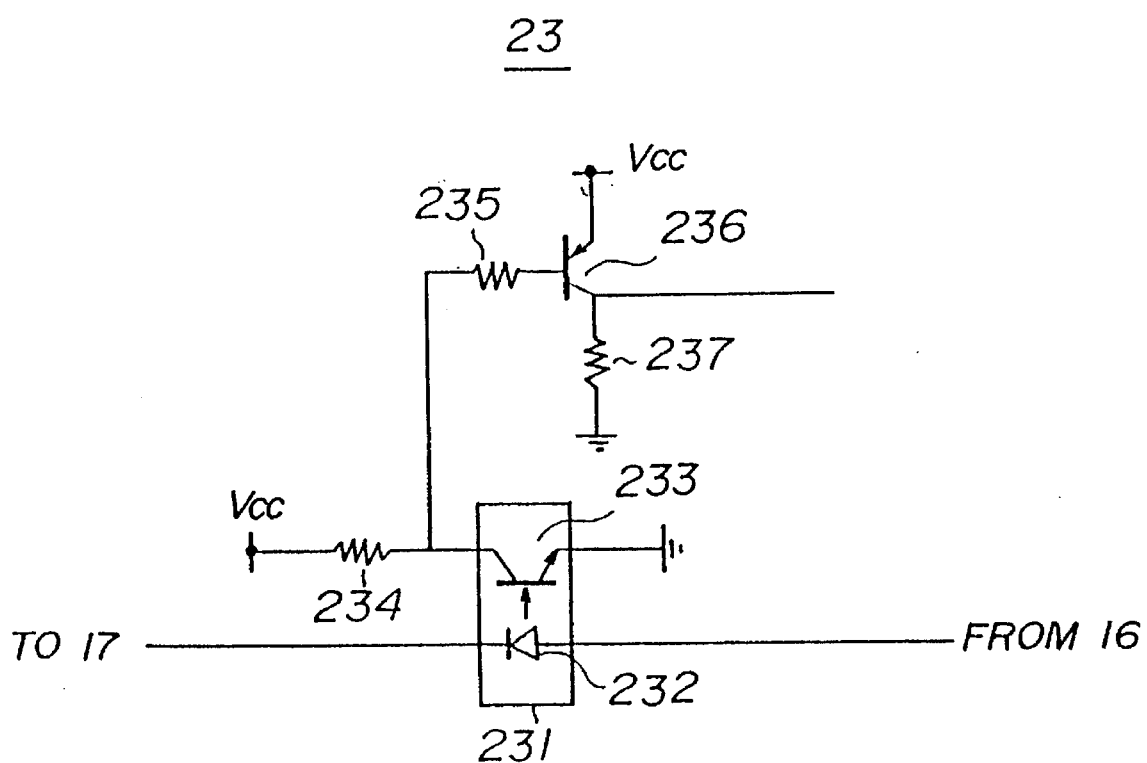
FIG. 5 is a circuit diagram of a current detection unit shown in FIG. 4.

FIG. 5 is a circuit diagram of the current detection circuit 23 shown in FIG. 4. The D.C. current supplied from the power device 31 to the charging circuit 17 passes through a light-emitting diode 232 of a photocoupler 231. Hence, the light-emitting diode 232 turns ON a transistor 233 of the photocoupler 231, and the transistor 233 passes a current from a power supply line Vcc to the ground via a resistor 234. As a result, the potential of the transistor 233 is approximately equal to a ground potential. When the transistor 233 is ON, a base current is allowed to pass through a resistor 235 and the transistor 233. Hence, the transistor 236 is turned ON. In this state, a collector current passes through a resistor 237. Hence, the potential of the collector of the transistor 236 increases to approximately the voltage Vcc. The collector of the transistor 236 serves as the output terminal of the current detection unit 23, which is connected to one of the two input terminals of the OR gate 24. The collector potential of the transistor 236 shown in FIG. 5 is applied to the control terminal of the relay 25 via the OR gate 24 and the control line 26. When the collector potential of the transistor 236 is almost equal to the ground level, the relay 25 is OFF, so that the relay 25 is maintained in the open state. When the collector potential of the transistor 236 is almost equal to the voltage Vcc, the relay 25 is ON, so that the relay 25 is maintained in the closed state. Further, as long as the processor 11 is outputting the control signal to the OR gate 24, the relay 25 is maintained in the ON state. As will be described later, the processor 11 continuously outputs the control signal to the OR gate 24 until the cordless telephone set 1000 is put offhook.

While the relay 25 is maintained in the conducting state, the output terminal of the battery 15 is directly connected to the power supply line 20 via the relay 25. Even if the switch 19 is in the pause state, electricity can be supplied from the battery 15 to the radio interface unit 1, the signal receiver 8 and the processor 11. In response to the ringing tone generated by the sounder 14, the subscriber detaches the portable telephone set 1000 from the battery charger 30. Thereby, the terminals 16 of the portable telephone set 1000 are disconnected from the terminals 33 of the battery charger 30, and the D.C. current is no longer supplied to the charging circuit 17. At this time, the transistors 233 and 236 are turned OFF, and the ground potential is applied from the current detection unit 23 to the OR gate 24. However, the processor 11 continues to supply the high-level control signal to the OR gate 24, which is always ON by the supply of electricity from the battery 15. Thus, the relay 25 is continuously maintained in the ON state, and electricity is continuously supplied to the radio interface unit 1, the signal receiver 8 and the processor 11 via the relay 25. Then, the subscriber switches the mode from the pause mode P to the active mode A. Thereby, electricity is supplied to all of the structural elements of the cordless telephone set 1000, and the subscriber can communicate with the caller. Then, the subscriber will put offhook the portable telephone set. It is possible to design the switch 19 and the hook switch 13 so that the switch 19 automatically switches to the active mode when the hook switch 13 is turned ON, and to the standby mode when the hook switch 13 is turned OFF.

Figure 6:
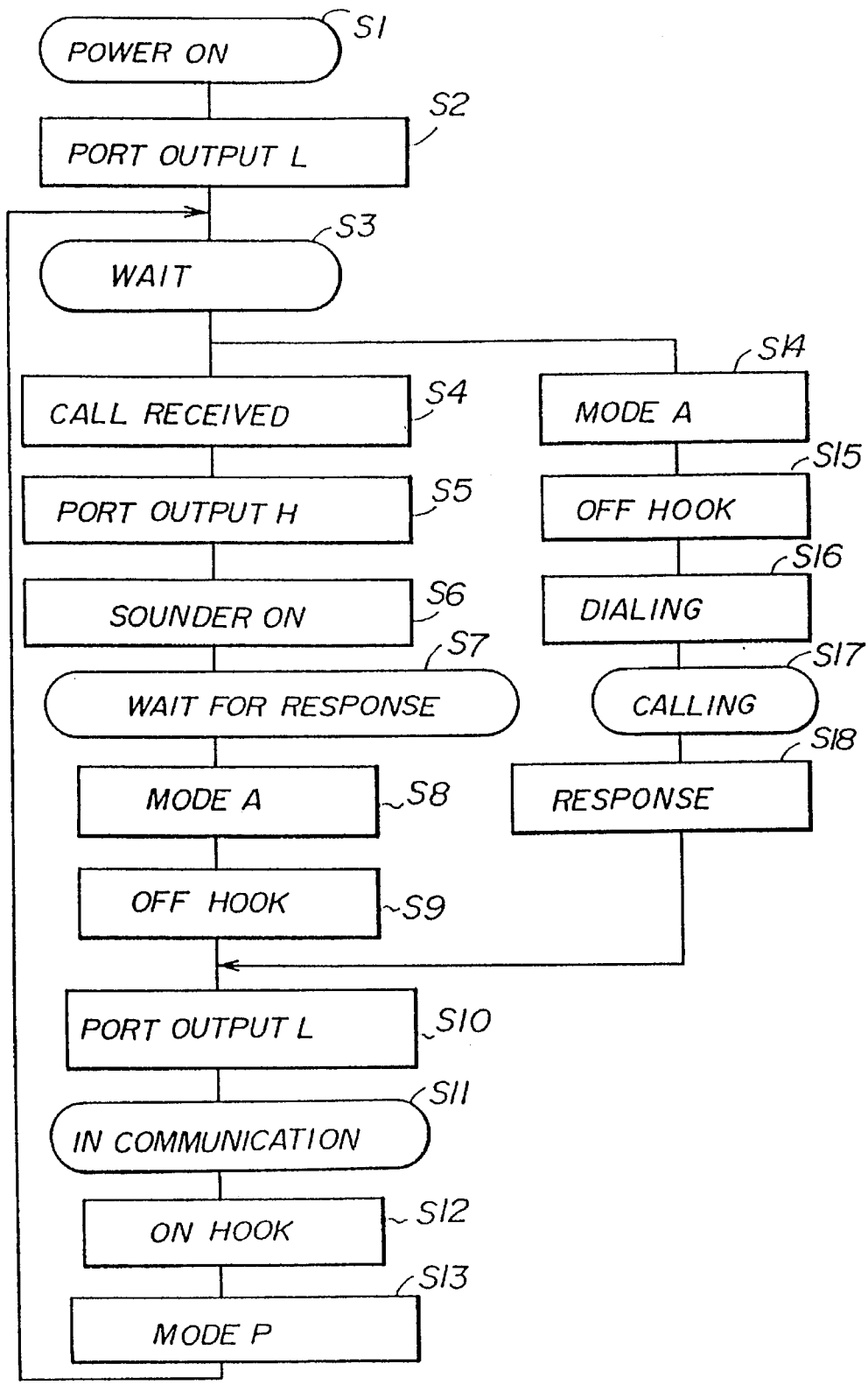
FIG. 6 is a flowchart showing the operation of the portable telephone set shown in FIG. 4.

FIG. 6 is a flowchart of the operation of the processor 11. The battery charger 30 is connected to the portable telephone set 1000 set to the pause mode P (power ON; step S1). The processor 11 sets the level of its control port connected to the OR gate 24 to a low (L) level (step S2). Then, the processor 11 waits for incoming or outgoing calls (step S3). When the processor 11 is informed by the signal receiver 8 of receipt of a call (step S4), the processor 11 sets the control port connected to the OR gate 24 to a high level (step S5). Then the processor 11 drives the sounder 14 so that the ringing tone is generated by the sounder 14. Then the processor 11 waits for a response (step S7). The subscriber changes the mode of the switch 19 from the pause mode P to the active mode A (step S8), and puts the cordless telephone set 1000 offhook (step S9). Alternatively, the subscriber puts the portable telephone set 1000 offhook and turns the switch 19 from the pause mode P to the active mode A. Then, the processor 11 sets the control port connected to the OR gate 24 to the low level (step S10). Then, speech communications start (step S11). When the subscriber terminates the speech communications, the hook switch 13 is turned OFF (step S12). Then, the subscriber changes the mode from the active mode A to the pause mode P (step S13), and connects the portable telephone set 1000 to the battery charger 30.

When the subscriber calls another subscriber, he or she changes the mode from the pause mode P to the active mode A (step S14) and puts the portable telephone set 1000 (step S15). Alternatively, at step S14, the subscriber puts the portable telephone set 1000 offhook and then changes the mode from the pause mode P to the active mode A second. Then, the subscriber dials the telephone number of the called subscriber (step S16), which is called by means of the sounder of the called subscriber (step S17). The processor 11 receives a response from the called subscriber (step S18), and executes step S10.

Figure 7:
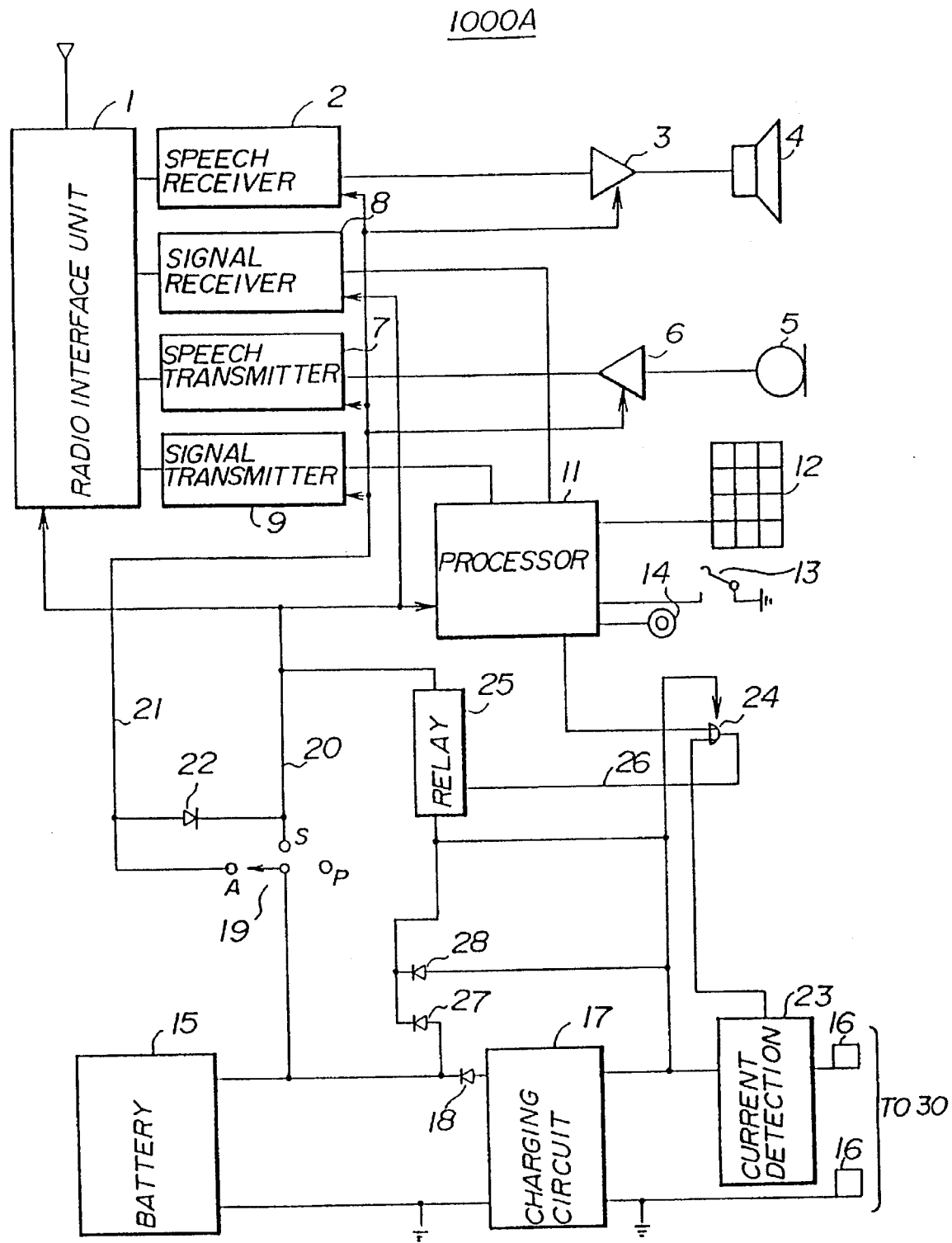
FIG. 7 is a block diagram of a portable telephone set according to a second embodiment of the present invention.

FIG. 7 is a block diagram of a second embodiment of the present invention. In FIG. 7, parts that are the same as parts shown in the previously described figures are given the same reference numerals as previously. The second embodiment of the present invention corresponds to a modification of the above-mentioned first embodiment thereof. The second embodiment of the present invention is configured by adding two diodes 27 and 28 to the configuration shown in FIG. 4. One of the output terminals of the battery 15 is connected to the relay 25 via the diode 27. One of the terminals 16 is connected to the relay 25 via the diode 28. When the relay 25 is maintained in the conducting state, electricity from the battery charger 30 is directly supplied to the power supply line 20 via the terminal 16 and the diode 28. Hence, the potential of a node, at which the diode 28 and the relay 25 are connected to each other are connected to each other, is higher than that of the output terminal of the battery 15. In this state, the diode 27 is reversely biased and opencircuited. As a result, electricity from the battery 15 is not supplied to the power supply line 20 at all. In this state, the battery 15 is more efficiently charged.

Figure 8:
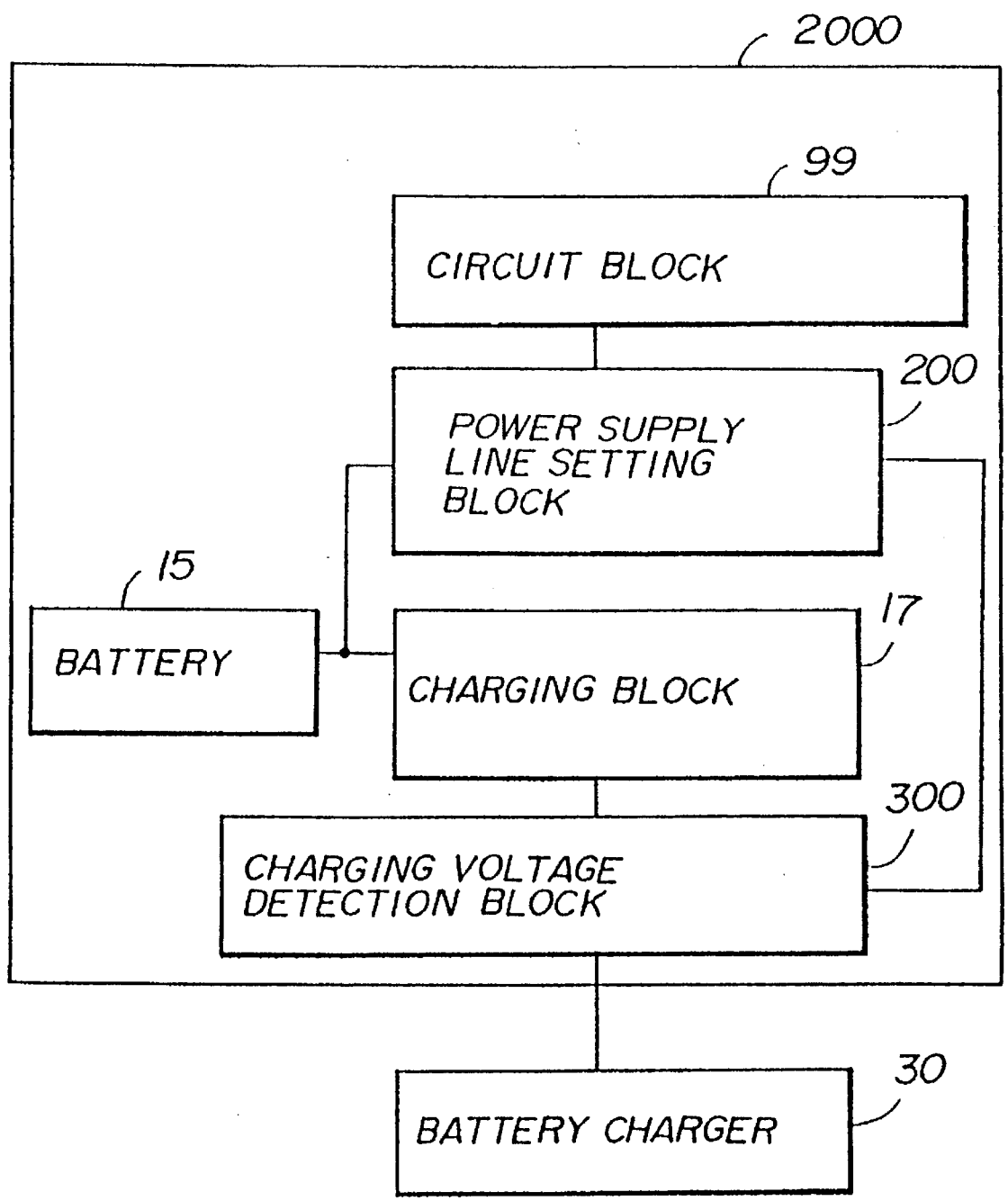
FIG. 8 is a block diagram showing an overview of a portable telephone set according to a third embodiment of the present invention.

A description will now be given of a third embodiment of the present invention. FIG. 8 is a block diagram showing an overview of a portable telephone set 2000 according to the third embodiment of the present invention. In FIG. 8, parts that are the same as parts shown in the previously described figures are given the same reference numerals as previously. The third embodiment of the present invention uses a charging voltage detection block 300 in lieu of the charging current detection block 100 shown in FIG. 3.

Figure 9:
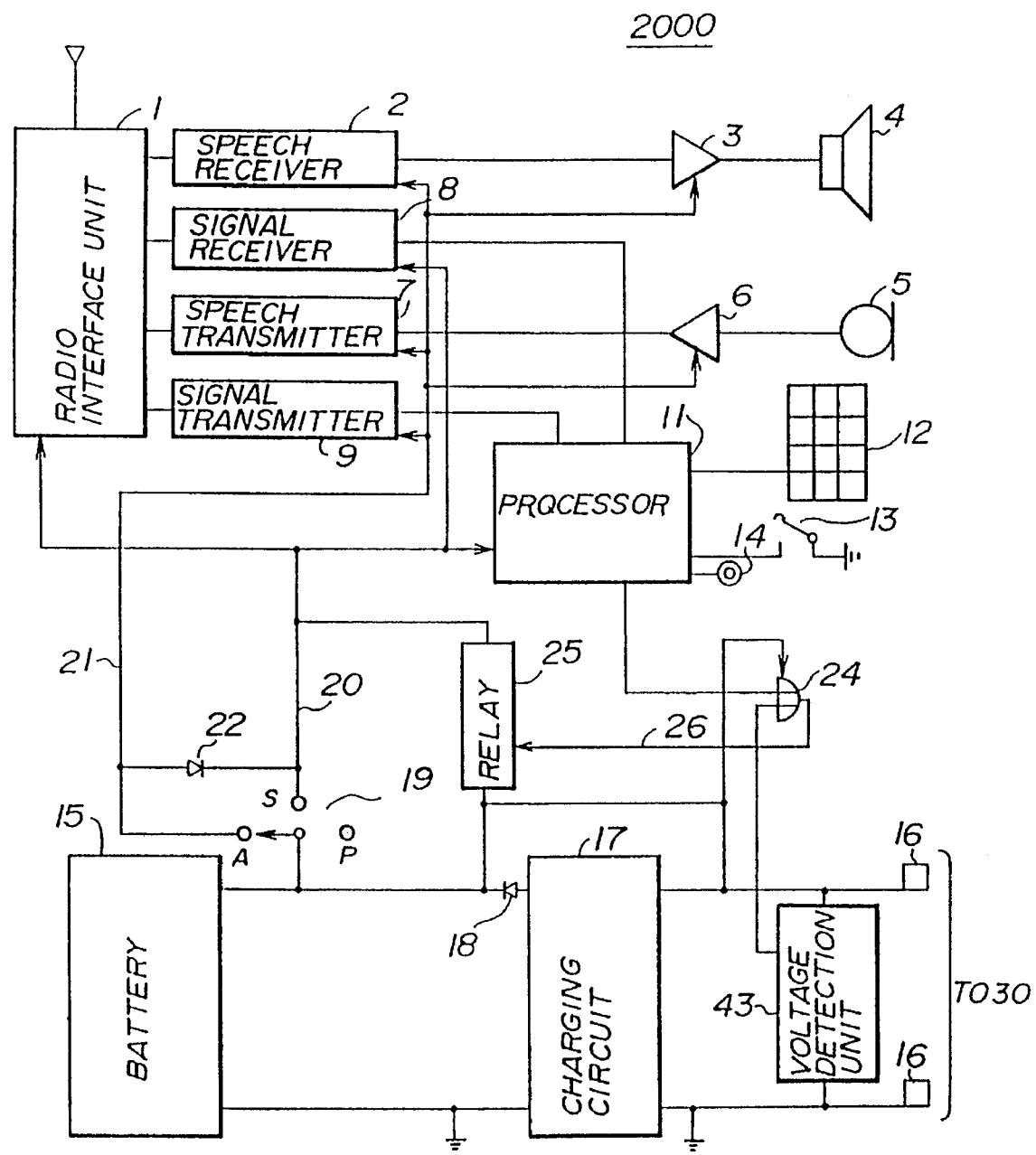
FIG. 9 is a block diagram illustrating the detail of the portable telephone set shown in FIG. 8.

FIG. 9 illustrates the details of the portable telephone set 2000 of the present invention shown in FIG. 8. In FIG. 9, parts which are the same as parts shown in the previously described figures are given the same reference numerals as previously. A voltage detection unit 43 is connected between the terminals 16. An output terminal of the voltage detection unit 43 is connected to one of the two input terminals of the OR gate 24. The voltage detection unit 43 detects a D.C. voltage developing between the terminals 16 connected to the terminals 33 of the battery charger 30. The other parts of the configuration shown in FIG. 9 are configured in the same manner as shown in FIG. 4.

Figure 10:
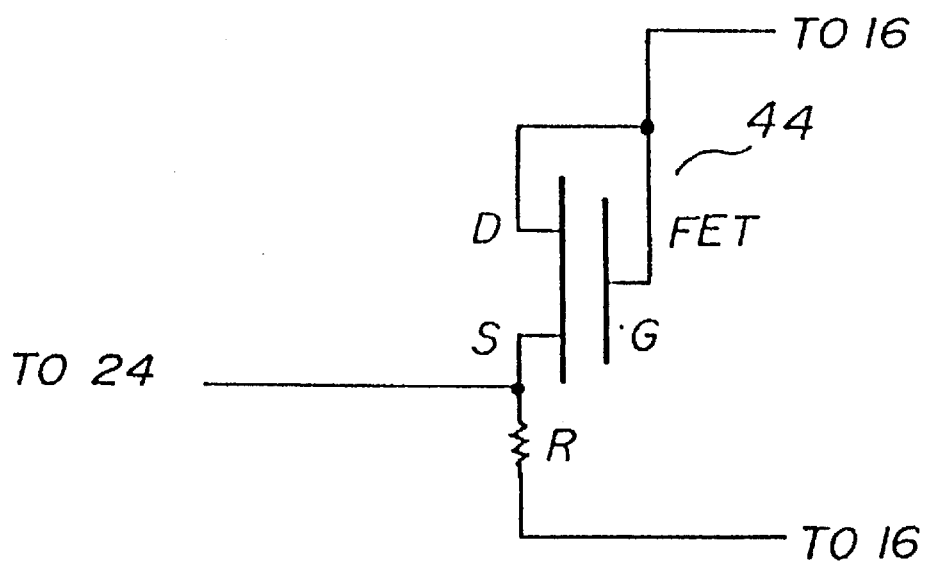
FIG. 10 is a circuit diagram of a voltage detection unit shown in FIG. 9.

FIG. 10 is a circuit diagram of the voltage detection unit 43 shown in FIG. 9. The voltage detection unit 43 shown in FIG. 10 comprises a field effect transistor (hereinafter simply referred to as an FET) 44. A gate G and a drain D of the FET 44 are connected to each other and connected to one of the two terminals 16. A source S of the FET 44 is connected to one of the two input terminals of the OR gate 24, and is connected to the other terminal 16 through a bias resistor R. When the battery charger 30 is connected to the portable telephone set 2000, the FET 44 is turned ON, and one of the two input terminals of the OR gate 24 is set to a high potential obtained at the source S of the FET 44.

Figure 11:
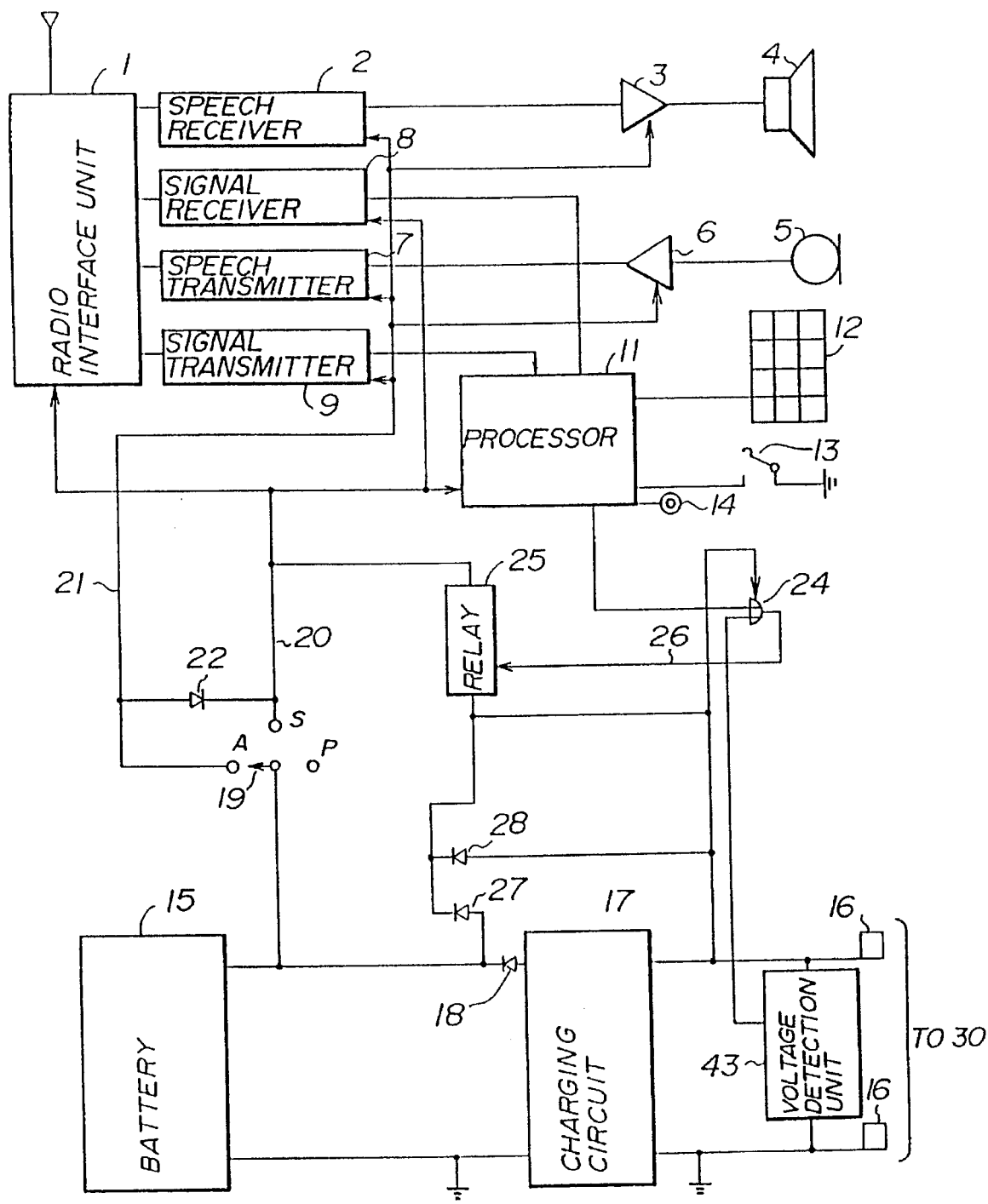
FIG. 11 is a block diagram of a portable telephone set according to a fourth embodiment of the present invention.

FIG. 11 is a block diagram of a portable telephone set 2000A according to a fourth embodiment of the present invention, which embodiment corresponds to a modification of the third embodiment of the present invention shown in FIG. 10. The aforementioned diodes 27 and 28 are added to the configuration shown in FIG. 10 in the same manner as shown in FIG. 7. The voltage detection unit 43 operates in the above-mentioned manner, and the diodes 27 and 28 operate in the aforementioned manner.

The relay 25 comprises a movable terminal, a stationary terminal and a coil driving the movable terminal. However, it is possible to use an electronic component in lieu of the above structure.

Figure 12:
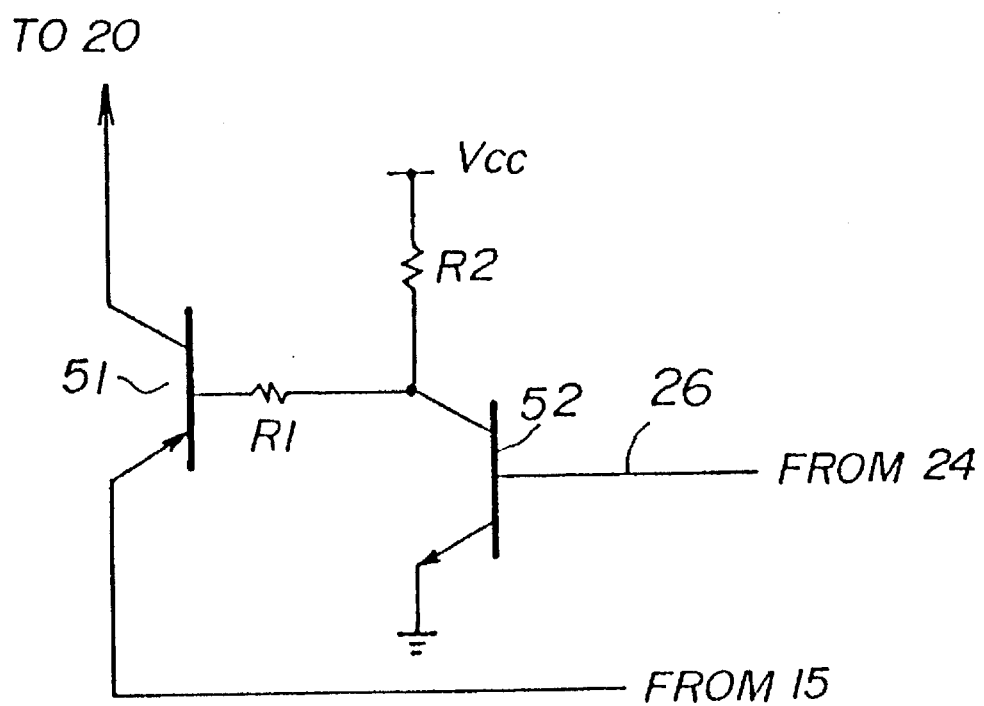
FIG. 12 is a circuit diagram of an electronic switch used in lieu of a relay used in the first through fourth embodiments of the present invention.

FIG. 12 is a circuit diagram of an electronic switch used in lieu of the relay 25. The electronic switch shown in FIG. 12 comprises a pnp transistor 51 and an npn transistor 52. One of the output terminals of the battery 15 is connected to an emitter of the transistor 51, and the collector thereof is connected to the power supply line 20. The base of the transistor 51 is coupled to the collector of the transistor 52 via a resistor R1. The collector of the transistor 52 is also coupled to the power supply line Vcc via a resistor R2. The emitter of the transistor 52 is connected to, for example, the ground. The base of the transistor is connected to the output terminal of the OR gate 24 via the control line 26.

The switch 19 can be formed with a mechanical component or an electronic component.

The present invention is not limited to the specifically described embodiments, and variations and modifications may be made without departing from the scope of the present invention. For example, the present invention includes a portable telephone set having a basic structure other than the aforementioned basic structure. For example, the present invention includes a portable telephone set which is directly coupled to an exchange via radio channels, without the host device.

What is claimed is:

1. A cordless telephone set comprising:

communications means for communicating with another telephone set via a transmission medium including radio channels, said communications means comprising a part which detects a call received via the transmission medium and indicates receipt of said call;

a battery generating electricity necessary to operate the cordless telephone set;

D.C. signal detection means for detecting a D.C. signal when the battery is coupled to a battery charger and charged thereby;

power supply line setting means, coupled to said part of the communications means and said D.C. signal detection means, for establishing a first power supply line for supplying the electricity generated by at least one of the battery and the battery charger to said part of the communications means when said D.C. signal detection means detects said D.C. signal; and switch means provided between the battery and the communications means for turning ON and OFF power supply from the battery to the communications means and establishing a second power supply line between the battery and the communications means, wherein the first power supply line established by said setting means is different from the second power supply line established by said switch means to enable said call to be received even when said switch is OFF, and wherein the first power supply line maintains supply of power from the battery to the communications means even if the cordless telephone set is detached from a battery charger when a call is received.

2. A portable telephone system comprising:

a portable telephone set; and a host device connected to an exchange via a transmission line and connected to said portable telephone set via radio channels, said portable telephone set comprising:

communications means for communicating with another cordless telephone set via the host device and the exchange, said communications means comprising a part which detects a call received via the host device and indicates receipt of said call;

a battery generating electricity necessary to operate the cordless telephone set;

D.C. signal detection means for detecting a D.C. signal when the battery is coupled to a battery charger and charged thereby;

power supply line setting means, coupled to said part of the communications means and said D.C. signal detection means, for establishing a first power supply line for supplying the electricity generated by at least one of the battery and the battery charger to said part of the communications means when said D.C. signal detection means detects said D.C. signal; and switch means provided between the battery and the communications means for turning ON and OFF power supply from the battery to the communications means and establishing a second power supply line between the battery and the communication means, wherein the first power supply line established by said setting means is different from the second power supply line established by said switch means to enable a call to be received even when said switch means is OFF, and wherein the first power supply line maintains supply of power from the battery to the communications means even if the cordless telephone set is detached from a battery charger when a call is received.

3. A cordless telephone set comprising:

communications means for communicating with another telephone set via a transmission medium including radio channels, said communications means comprising a part which detects a call received via the transmission medium and indicates receipt of said call;

a battery generating electricity necessary to operate the cordless telephone set;

D.C. signal detection means for detecting a D.C. signal when the battery is coupled to a battery charger and charged thereby;

power supply line setting means, coupled to said part of the communications means and said D.C. signal detection means, for establishing a first power supply line for supplying the electricity generated by at least one of the battery and the battery charger to said part of the communications means when said D.C. signal detection means detects said D.C. signal; and switch means provided between the battery and the communications means for turning ON and OFF power supply from the battery to the communications means and establishing a second power supply line between the battery and the communication means, wherein the communications means includes means for generating a signal which causes the power supply line setting means to maintain the first power supply line when the communications means detects a call to enable said call to be received even when said switch means is OFF; and wherein the first power supply line maintains supply of power from the battery to the communications means even if the cordless telephone set is detached from a battery charger when a call is received.

4. A cordless telephone set comprising:

communications means for communicating with another telephone set via a transmission medium including radio channels, said communications means comprising a part which detects a call received via the transmission medium and indicates receipt of said call;

a battery generating electricity necessary to operate the cordless telephone set;

stopping means for stopping supplying of electricity from the battery to the communications means;

D.C. signal detection means for detecting a D.C. signal when the battery is coupled to a battery charger and charged thereby;

electricity supply control means for supplying electricity from the battery charger to the communications means when the D.C. signal detection means detects the D.C. signal even if said stopping means stops supplying of electricity from the battery to the communications means, wherein said electricity supply control means comprises means for continuously supplying the electricity to the communications means even if the communications means detects a call addressed to the cordless telephone set and the D.C. signal detection means cannot detect the D.C. signal.

5. A cordless telephone set comprising:

communications means for communicating with another telephone set via a transmission medium including radio channels, said communications means comprising a part which detects a call received via the transmission medium and indicates receipt of said call;

a battery generating electricity necessary to operate the cordless telephone set;

D.C. signal detection means for detecting a D.C. signal when the battery is coupled to a battery charger and charged thereby;

power supply line setting means, coupled to said part of the communications means and said D.C. signal detection means, for establishing a first power supply line for supplying the electricity generated by at least one of the battery and the battery charger to said part of the communications means when said D.C. signal detection means detects said D.C. signal; and switch means provided between the battery and the communications means for turning ON and OFF power supply from the battery to the communications means and establishing a second power supply line between the battery and the communication means, wherein the first power supply line established by said power supply line setting means is different from the second power supply line established by said switch means; and wherein:

the first power supply line maintains supply of power from the battery to the communications means even if the cordless telephone set is detached from a battery charger when a call is received;

said switch means has a first mode, a second mode and a third mode;

the electricity generated by said battery is supplied to said communications means when said switch means is set in the first mode;

the electricity generated by said battery is supplied to only said part of the communications means when said switch means is set in the second mode; and the electricity generated by said battery is not supplied to said communications means at all when said switch means is set in the third mode.

6. A cordless telephone set comprising:

communications means for communicating with another telephone set via a transmission medium including radio channels, said communications means comprising a part which detects a call received via the transmission medium and indicates receipt of said call;

a battery generating electricity necessary to operate the cordless telephone set;

D.C. signal detection means for detecting a D.C. signal when the battery is coupled to a battery charger and charged thereby;

power supply line setting means, coupled to said part of the communications means and said D.C. signal detection means, for establishing a power supply line for supplying the electricity generated by at least one of the battery and the battery charger to said part of the communications means when said D.C. signal detection means detects said D.C. signal; and switch means provided between said battery and said communications means and which has a first mode, a second mode and a third mode; wherein:

the electricity generated by said battery is supplied to said communications means when said switch means is set in the first mode;

the electricity generated by said battery is supplied to only said part of the communications means when said switch means is set in the second mode;

the electricity generated by said battery is not supplied to said communications means at all when said switch means is set in the third mode; and the power supply line maintains supply of power from the battery to the communications means even if the cordless telephone set is detached from a battery charger when a call is received.

* * * * *